(12) United States Patent
Kashiwase

(10) Patent No.: US 7,754,138 B1
(45) Date of Patent: Jul. 13, 2010

(54) APPARATUS AND METHOD OF MANUFACTURING STACKABLE CONTAINERS

(76) Inventor: Akira Kashiwase, 757 Matuda Cho, Ashikaga City, Tochigiken (JP) 326-0101

( * ) Notice: Subject to any disclaimer, the term of this patent is extended or adjusted under 35 U.S.C. 154(b) by 579 days.

(21) Appl. No.: 11/483,511

(22) Filed: Jul. 10, 2006

(51) Int. Cl.
*B29C 49/48* (2006.01)

(52) U.S. Cl. ........................................ 264/534; 425/525

(58) Field of Classification Search ................ 425/525, 425/522; 264/534, 523
See application file for complete search history.

(56) References Cited

U.S. PATENT DOCUMENTS

| | | | |
|---|---|---|---|
| 3,029,468 A * | 4/1962 | Valyi ........................... | 425/525 |
| 3,050,773 A * | 8/1962 | Hagen .......................... | 264/534 |
| 3,650,653 A * | 3/1972 | Erickson ...................... | 425/218 |
| 3,753,641 A * | 8/1973 | Turner et al. ............. | 425/451.6 |
| 3,865,531 A * | 2/1975 | Moore et al. ................ | 425/525 |
| 3,949,034 A * | 4/1976 | Uhlig .......................... | 264/530 |
| 4,351,454 A | 9/1982 | Maynard, Jr. | |
| 4,541,529 A | 9/1985 | Hestehave et al. | |
| 4,573,595 A * | 3/1986 | Mednis ......................... | 215/10 |
| 4,573,603 A | 3/1986 | Starling et al. | |
| 4,769,206 A * | 9/1988 | Reymann et al. ............. | 264/534 |
| 4,793,491 A | 12/1988 | Wolf et al. | |
| 5,259,509 A | 11/1993 | Boal, Jr. et al. | |
| 5,361,906 A | 11/1994 | Sterett | |
| 5,485,920 A * | 1/1996 | Fritz .......................... | 206/509 |
| 5,779,051 A | 7/1998 | Boutin | |
| 5,862,941 A | 1/1999 | Jones | |
| 6,053,345 A | 4/2000 | Jones | |
| 6,318,598 B1 | 11/2001 | Schmitt | |
| 6,772,912 B1 | 8/2004 | Schall et al. | |

FOREIGN PATENT DOCUMENTS

| | | |
|---|---|---|
| EP | 0024.165 | 2/1981 |
| GB | 953.411 | 3/1964 |
| GB | 2.397.572 | 7/2004 |
| JP | 2004182334 | 7/2004 |
| JP | 2004237707 A * | 8/2004 |

OTHER PUBLICATIONS

Partial machine translation of JP 2004-237707 A dated Aug. 2004 obtained from the JPO website.*

* cited by examiner

*Primary Examiner*—Robert B Davis
(74) *Attorney, Agent, or Firm*—Michael I. Kroll

(57) ABSTRACT

A water bottle and the method of manufacture concerning blow moulding. The improved blow moulding method and relevant apparatus is capable of making complicated designs with an equal wall thickness. Especially bottles used for the storage of water sold, shipped and delivered to consumers with the bottles returned when empty.

5 Claims, 15 Drawing Sheets

STEP C

STEP A

STEP B

STEP C

EXAMPLE A

US 7,754,138 B1

APPARATUS AND METHOD OF MANUFACTURING STACKABLE CONTAINERS

BACKGROUND OF THE INVENTION

1. Field of the Invention

The present invention relates generally to receptacles and, more specifically, to a water bottle and the method of manufacture. The present invention utilizes technology used to create plastic bottles for storing drinking water formed by the blow moulding method. The improved blow moulding method and relevant apparatus is capable of making complicated designs with an equal wall thickness.

The water bottle of the present invention is that used for the storage of water sold, shipped and delivered to consumers with the bottles returned when empty.

Typically, bottles of this size are difficult to handle and even attempts at adding a handle formed in the side was deemed by consumers difficult to grasp and lift. Also, while it may be economical to produce cylindrically shaped bottles, the shape is ill-suited for shipping and storage having a larger footprint than a polygonal form.

The water bottle of the present invention provides a receptacle having a recessed bottom formed to encompass the neck of a similar receptacle when stacked thereon and further formed wherein the interior recess includes improved handling means by forming a portion of the interior recess depending to an interior base wall appropriately spaced from the exterior wall of one or more polygonal facets and of sufficient height to serve as a handhold from one or more sides.

While the bottle in itself is an improved innovation over the prior art, the method employed in the bottle manufacture also results in a product having a consistent wall thickness throughout providing a product of higher quality with substantially less probability of containment failure. The method is comprised of expanding the parison (liquid plastic) in a mould with the mould base portion spaced away for an initial resin expansion that produces the consistent wall thickness. A predetermined amount of parison extends from the open base which is then moved into engagement with the mould walls creating the base recess as the parison is fully expanded. Therefore, in addition to the improved ergonomic bottle of the present invention, the present invention provides a method of manufacture comprising a mould having a first member and a second member with means for moving the second member into engagement with the first member at a predetermined time during a blow moulding task and the method of expanding the parison within the first member having the second member in an initial wait-state until a predetermined amount of parison expansion has occurred whereupon the second member is moved into engagement with the first member forming the container shape which is finalized during further parison expansion.

It is to be understood that while one embodiment of the present invention is depicted in the accompanying drawings for illustrative purposes, variations of the shape are possible without departing from the functional elements and are therefore included.

2. Description of the Prior Art

There are other molded containers designed for liquids. Typical of these is U.S. Pat. No. 4,351,454 issued to Maynard, Jr. on Sep. 28, 1982.

Another patent was issued to Hestehave, et al. on Sep. 17, 1985 as U.S. Pat. No. 4,541,529. Yet another U.S. Pat. No. 4,573,603 was issued to Starling, et al. on Mar. 4, 1986 and still yet another was issued on Dec. 27, 1988 to Wolf, et al. as U.S. Pat. No. 4,793,491.

Another patent was issued to Boal, Jr., et al. on Nov. 9, 1993 as U.S. Pat. No. 5,259,509. Yet another U.S. Pat. No. 5,361,906 was issued to Sterett on Nov. 8, 1994. Another was issued to Boutin on Jul. 14, 1998 as U.S. Pat. No. 5,779,051 and still yet another was issued on Jan. 26, 1999 to Jones as U.S. Pat. No. 5,862,941.

Another patent was issued to Jones on Apr. 25, 2000 as U.S. Pat. No. 6,053,345. Yet another U.S. Pat. No. 6,318,598 was issued to Schmitt on Nov. 20, 2001. Another was issued to Schall, et al. on Aug. 10, 2004 as U.S. Pat. No. 6,772,912 and still yet another was issued on Mar. 25, 1964 to Container Patent Company as U.K. Patent No. GB953,411.

Another patent was issued to Epperson on Aug. 7, 1980 as European Patent Application No. EP0024165. Yet another U.K. Patent No. GB2397572 was issued to Welsh, et al. on Jul. 28, 2004. Another was issued to Kashiwase on Jul. 2, 2004 as Japan Patent No. JP2004182334.

U.S. Pat. No. 4,351,454

Inventor: Walter P. Maynard, Jr.

Issued: Sep. 28, 1982

A unitary liquid container formed of molded plastics material has a flexible filling and pouring nozzle of sufficient size to be self-venting. The top of the nozzle, when in an upright position, coacts with a top surface on the container lifting handle to form a level stacking surface. A manipulating recess is provided near the bottom of the container.

U.S. Pat. No. 4,541,529

Inventor: Borge Hestehave, et al.

Issued: Sep. 17, 1985

A stackable plastic container has a unitarily formed handle on a top surface thereof. In accordance with a first feature, the top wall is provided with a pair of upwardly projecting portions that are asymmetrically disposed relative to a center line extending across the container and between which the handle extends. The bottom portion is provided with supporting and stacking nubs that are situated at positions corresponding to the projecting top wall portions, and the top wall portions have nub-receiving stacking recesses positioned on opposite sides of the handle so as to enable stacking of a like container on the container by engagement of supporting and stacking nubs of the like container in the stacking recesses of the container. According to a second aspect of the invention, a supplemental handle is provided which may be detachably attached to the container handle so as to convert the container from a single handle container to a triple-handle container, complying with military specifications for Jerry-type cans.

U.S. Pat. No. 4,573,603

Inventor: Jeffrey T. Starling

Issued: Mar. 4, 1986

A container for fluid products includes an inner shell of sheet metal which has a substantially cylindrical body and top and bottom end walls. A first resilient outer member encases the inner shell bottom end wall and forms a base portion for the container. The first member includes a substantially cylindrical side wall portion and a base portion which, in turn, includes a ring section, provided on its outer surface with a pair of spaced ribs, as well as a recessed inner section. A second resilient outer member encases the inner shell top end wall and forms a top portion for the container. The second member includes a substantially cylindrical side wall portion and a top portion including a ring section, having a planar outer surface, and a recessed inner section. The ring section has a suitable diameter and is sized to fit between the first portion spaced pair of ribs to permit stacking of the container.

U.S. Pat. No. 4,793,491

Inventor: Raymond D. Wolf, et al.

Issued: Dec. 27, 1988

A pressurizable chemical vessel for storing and transporting fluid chemicals and delivering the contents under pressure to the point of the use is comprised of an outer housing, an inner fluid container, and an energy absorbing filler therebetween. The outer housing consists of an upper canister and a canister base removably attached thereto. The entire assembly is desirably of nonmetallic construction and the vessels are designed to be securely stackable for storage and transport. The neck of the chemical vessel is adapted to receive a detachable pressurizable fluid delivery assembly of known design.

U.S. Pat. No. 5,259,509

Inventor: Stewart Boal

Issued: Nov. 9, 1993

A stackable portable container assembly for storing fluid having a pallet base and a tank having top, middle and bottom portions. The top portion can be integral with the tank or removable from the middle portion. A plurality of cables removably secure the tank to the pallet base. The bottom portion and an upper surface of the pallet base comprise cooperating male and female receptacles which are adopted to cooperate with each other when the tank is mounted to the pallet base. The bottom portion further comprises at least one drain. A drain valve coupled to the drain of the tank to enable the fluid stored in the tank to be removed at a predetermined rate. A lever-operated drain stopper is optionally disposed in the tank to prevent the fluid from flowing through the drain opening. The top portion comprises projections which cooperate with the pallet base of a second portable container assembly to enable the second portable container assembly to be securely stacked on top of the portable container assembly and the pallet base further comprises openings adopted to cooperate with projections on a top portion of the second portable container assembly to enable the portable container assembly to be mounted on top of the second portable container assembly.

U.S. Pat. No. 5,361,906

Inventor: Robert A. Sterett

Issued: Nov. 8, 1994

A stackable container having excellent resistance to impact breakage includes (1) a plastic tank for containing liquids having at least one opening in its upper end and upper and lower abutments extending around sidewalls, (2) a top member engaged to the upper end of the tank having a downwardly facing abutting edge resting upon said upper abutment and (3) a bottom member engaged to the lower end of the tank having an upwardly facing abutting edge resting upon said lower abutment and having a plurality of downwardly extending legs. The tank has a generally rectangular configuration with a sump defined at one corner extending downwardly from the bottom and an internally raised area at another corner defining a depression forming an external ledge. Two tanks may be stacked in bottom-to-bottom relationship with the sump of one tank engaging the ledge of the other tank.

U.S. Pat. No. 5,779,051

Inventor: Raymond Boutin

Issued: Jul. 14, 1998

A container for liquids is configured for two-plane stacking with one or two similarly constructed containers; it comprises a body having a rectanguloid configuration with a top wall defining a recessed liquid pouring spout area and a raised handle area. The bottom wall has an underface included within a downwardly extending peripheral border defined by a series of spaced legs and pockets between the legs. The configurations of the top and bottom walls allow such containers to be stacked in two planes: one plane includes containers one directly above the other or one above the other but vertically offset thereto; a second plane includes containers in vertical planes 90.degree. to one another. The handle area has rectangular planar faces and a handle bar therebetween, both cooperating with the legs and pockets of one or two superposed containers to secure them in stacked relations.

U.S. Pat. No. 5,862,941

Inventor: Peter Timothy Jones

Issued: Jan. 26, 1999

A container of the type which can be lifted and carried by a person, the container comprising a bottom wall, a top wall, a back wall, which faces the person's body when the container is carried, a front wall opposite to the back wall, two opposed side walls extending between the back and front walls, a first hand-grippable portion positioned at the juncture between the bottom wall and one of the side walls, and a second hand-grippable portion positioned adjacent the juncture between the front wall and the other of the side walls.

U.S. Pat. No. 6,053,345

Inventor: Peter Timothy Jones

Issued: Apr. 25, 2000

A container of the type which can be lifted and carried by a person, the container comprising a bottom wall, a top wall, a back wall, which faces the person's body when the container is carried, a front wall opposite to the back wall, two opposed side walls extending between the back and front walls, a first hand-grippable portion positioned at the juncture between the bottom wall and one of the side walls, and a second hand-grippable portion positioned adjacent the juncture between the front wall and the other of the side walls.

U.S. Pat. No. 6,318,598

Inventor: Anthony L. Schmitt

Issued: Nov. 20, 2001

A stackable container for storing and dispensing a liquid has upright walls, a top wall and a bottom wall providing a chamber for storing a liquid. Adjacent upright walls are joined to corners. One corner has a bottom portion located above the plane of the bottom wall providing a space below the one corner. The top wall has a fill opening at the top of the one corner. An ON-OFF valve attached to a lower portion of the upright wall of the container is used to drain liquid from the container. A modified stackable combined container and pallet for storing and dispensing a liquid has upright walls, a top wall and a bottom wall providing a chamber for storing a liquid. Adjacent upright walls are joined to corners. One corner of the pallet has an inwardly curved recess to provide a space below the one corner of the container. The top wall of the container has a fill opening at the top of the one corner. An ON-OFF valve attached to a lower portion of the upright wall of the container is used to drain liquid from the container.

U.S. Pat. No. 6,772,912

Inventor: James L. Schall

Issued: Aug. 10, 2004

A liquid storage and dispensing tank for use individually or for use in a stacked manner. The tank has an upper sump formed therein which collects the liquid in the tank when the tank has been turned upside down to completely drain liquid from the tank. The upper end of the tank has a pocket formed in a raised central portion thereof which receives a bottom sump of a tank stacked thereupon. The tank has a pair of forklift pockets formed in the bottom thereof which are accessible from the front of the tank. The tank also has conveniently accessible fill and drain openings. The tank is comprised of one-piece plastic and is formed by rotational molding or the like.

U.K. Patent Number GB953,411

Inventor: Container Patent Company

Issued: Feb. 24, 1960

A collapsible container, which may be loaded and unloaded either when suspended or when resting on the ground, comprises rigid end members 1, 2 and a flexible body 3 to which the members 1, 2 are removably or permanently secured. Closable filling and discharge openings 4, 5 and suspension cables 8 are provided. The members 1, 2 may consist of wood, metal or synthetic plastics such as polyethylene, hard p.v.c., a polyester, a phenolic resin, or two or more of these plastics reinforced by glass fibre, felt or textile filaments. The body 3 may consist of one or more layers of plastics material with a textile reinforcement, the plastics being p.v.c. or artificial rubber. The container may be of oval or polygonal cross-section or in the shape of a truncated cone. An inner lining or casing, FIG. 3 (not shown) may be made of a polyamide, p.v.c., polyurethane, silicone, polyester, or artificial rubber; alternatively it may be of crepe paper coated with plastics material, or in the form of a seamless tube crimped at its ends to fit the container openings. The ends of the liner may be wrapped round a retaining member, FIGS. 4 and 5 (not shown); and it may be of an elastic material which causes it to contract as the weight of the contents decreases, FIG. 6A (not shown). The contents may be evacuated by hydraulic or pneumatic means (see Division F1). The liner may be inflated by means of compressed air before the liquid cargo is filled into it; or the liquid may itself be filled under pressure. Composite end plates may be fitted, FIG. 7, the container being stackable either when filled or in its collapsed condition, FIG. 7A (not shown). Clamps 553 may secure the container when collapsed. Closures.-A plate 561 and a threaded member 560 are formed with co-operating tapering cams and cut-out portions to provide a bayonet lock assembly closing the filling opening. The plate 561 has radial ribs, FIG. 9 (not shown), to provide a hand grip for turning the plate. The assembly may be locked in position by means of a slide 566 carrying a cylindrical head 570 which engages with one of a series of notches 572, 573 in the member 560 and a ring-nut 559 respectively. The opening in the container base is closed in the same way.

European Patent Application Number EP0024165

Inventor: Charles N. Epperson

Issued: Aug. 7, 1980

The container has a vertical pouring spout (14) at its top and adjacent the side thereof. A recess (18) is provided in the bottom of the container for receiving the spout (14) of another container when two or more containers are stacked in an upright nesting condition, and a recess (18) in the top of the container is provided in spaced relation to the spout for receiving the downwardly projecting spout of a super-imposed inverted container while the spout of the given container is simultaneously received in the recess in the top of the inverted container. The two recesses may extend into each other, as shown, or may be separate. The position shown is suitable for packing for transport, whereas, for display, the containers would all be upright in a stack.

U.K. Patent Number GB2397572

Inventor: Thomas Welsh, et al.

Issued: Jul. 28, 2004

A stackable, nestable container has outwardly tapered side walls (22-28) extending upwardly from a bottom wall (20) and rigid support members (60) spaced about the bottom wall (20). In a nesting relationship within a similar container the support members (60) of the upper container are supported on the support members (60) of the similar container. Outwardly tapered stress-relieving triangular corner surfaces (50) extend upwardly between 130 {and 140} from corners of the bottom wall (20) and connect to the side walls (22-28). A lid (14) has a rim (76) for placement around a corner rim (40) with means to releasably secure the lid (14) to the container rim (40). A downwardly extending channel (54) around the bottom wall (20), preferably accommodating the support members (60), may cooperate with a recess (70) in the lid (14) for stacking. Vent openings (36) may be provided.

Japan Patent Number JP2004182334

Inventor: Akira Kashiwase

Issued: Jul. 2, 2004

PROBLEM TO BE SOLVED: To provide a container which is made stackable in tier, easy to carry about, and efficient in handling by raising the bottom, attaching a handle, and providing a polygonal side face in a conventional container, which has a flat bottom, and is hard to stack and carry about by inserting fingers under the bottom. SOLUTION: In the plastic container for liquid, the bottom is raised, a handle is provided, and the side is formed in a polygonal shape so as to save cost and spaces for storage and transportation. Thus, the container is made easily portable, enabling an efficient handling.

While these receptacles may be suitable for the purposes for which they were designed, they would not be as suitable for the purposes of the present invention, as hereinafter described.

SUMMARY OF THE PRESENT INVENTION

A primary object of the present invention is to provide a fluid receptacle of improved wall thickness consistency and its method of manufacture.

Another object of the present invention is to provide a fluid receptacle having a base incorporating a recess for receiving the neck of a similar receptacle when stacked.

Yet another object of the present invention is to provide a fluid receptacle wherein said recess includes forming at least one hand hold within said recess.

Still yet another object of the present invention is to provide a fluid receptacle having a polygonal exterior surface to optimized the shipping and storage of a plurality of said receptacles.

Another object of the present invention is to provide a method of manufacture comprising a mould having a first member and a second member that is movable relative to the first member forming an integral part of the method of manufacture.

Yet another object of the present invention is to provide a method wherein the parison is initially expanded within a base open mould to produce a consistent wall thickness.

Still yet another object of the present invention is to provide a method wherein once the initial parison expansion is performed the base of the mold forming the second member is moved into engagement with the mould first member, therein forming a base recess.

Another object of the present invention is to provide a method of manufacture wherein the parison is expanded to its final form when the mould section are conjoined.

Yet another object of the present invention is to provide a method of manufacture wherein the first and second mould members can be comprised of more than one section with the second member or members are moved either individually or in concert to form the base recess having a substantially similar wall thickness throughout.

Additional objects of the present invention will appear as the description proceeds.

The present invention overcomes the shortcomings of the prior art by providing a water bottle and the method of manufacture concerning blow moulding. The improved blow moulding method and relevant apparatus is capable of making complicated designs with an equal wall thickness. Especially bottles used for the storage of water sold, shipped and delivered to consumers with the bottles returned when empty.

The water bottle of the present invention provides a receptacle having a recessed bottom formed to encompass the neck of a similar receptacle when stacked thereon and further formed wherein the interior recess includes improved handling means by forming a portion of the interior recess depending to an interior base wall appropriately spaced from the exterior wall of one or more polygonal facets and of sufficient height to serve as a handhold from one or more sides.

Furthermore, the present invention provides a method of manufacture that results in a product having a consistent wall thickness throughout providing a product of higher quality with substantially less probability of containment failure. The method is comprised of expanding the parison (liquid plastic) in a mould with the mould base portion spaced away for an initial resin expansion that produces the consistent wall thickness. A predetermined amount of parison extends from the open base which is then moved into engagement with the mould walls creating the base recess as the parison is fully expanded. Therefore, in addition to the improved ergonomic bottle of the present invention, the present invention provides a method of manufacture comprising a mould having a first member and a second member with means for moving the second member into engagement with the first member at a predetermined time during a blow moulding task and the method of expanding the parison within the first member having the second member in an initial wait-state until a predetermined amount of parison expansion has occurred whereupon the second member is moved into engagement with the first member forming the container shape which is finalized during further parison expansion.

It is to be understood that while one embodiment of the present invention is depicted in the accompanying drawings for illustrative purposes, variations of the shape are possible without departing from the functional elements and are therefore included.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 5:
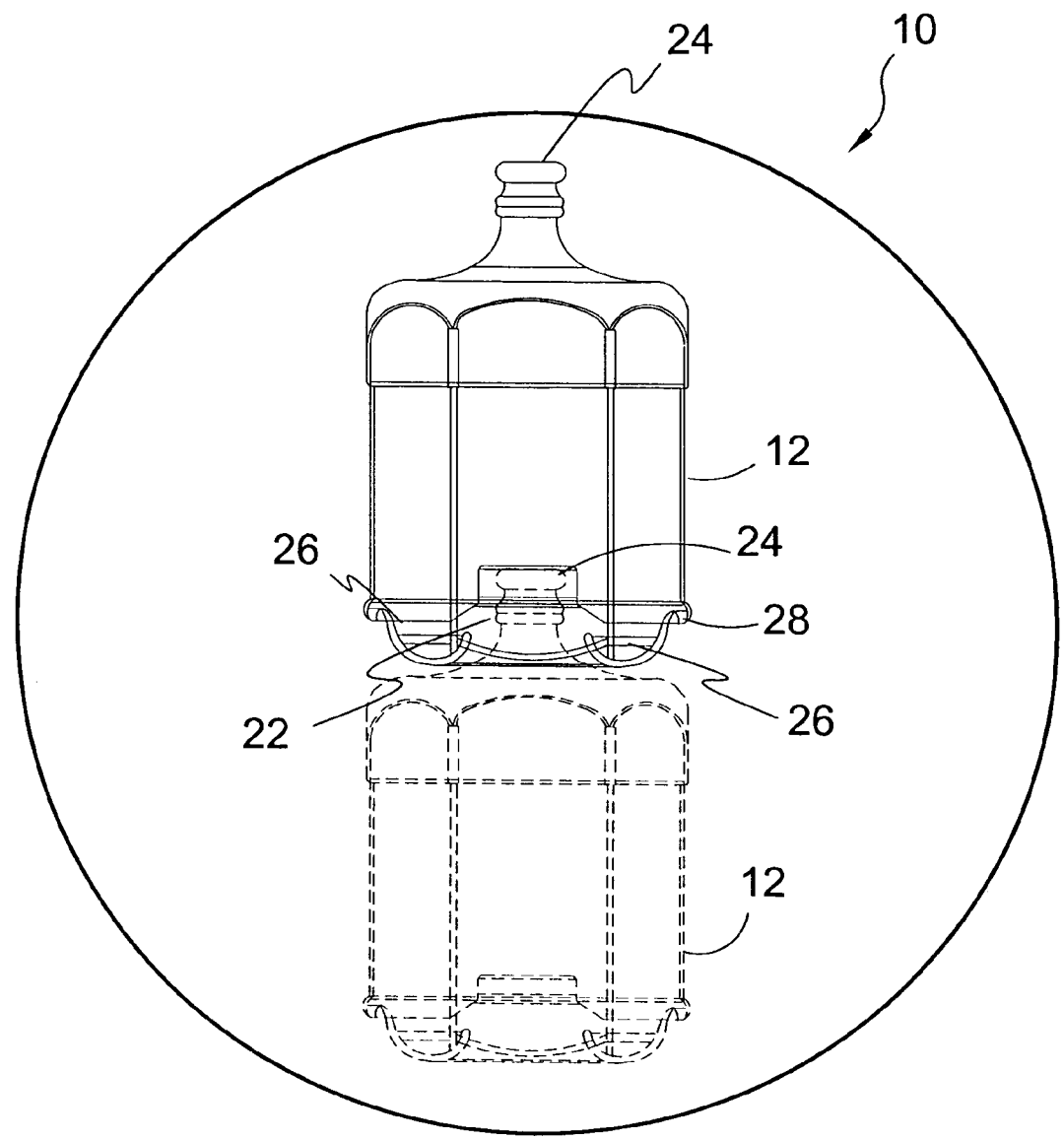
Figure 6:
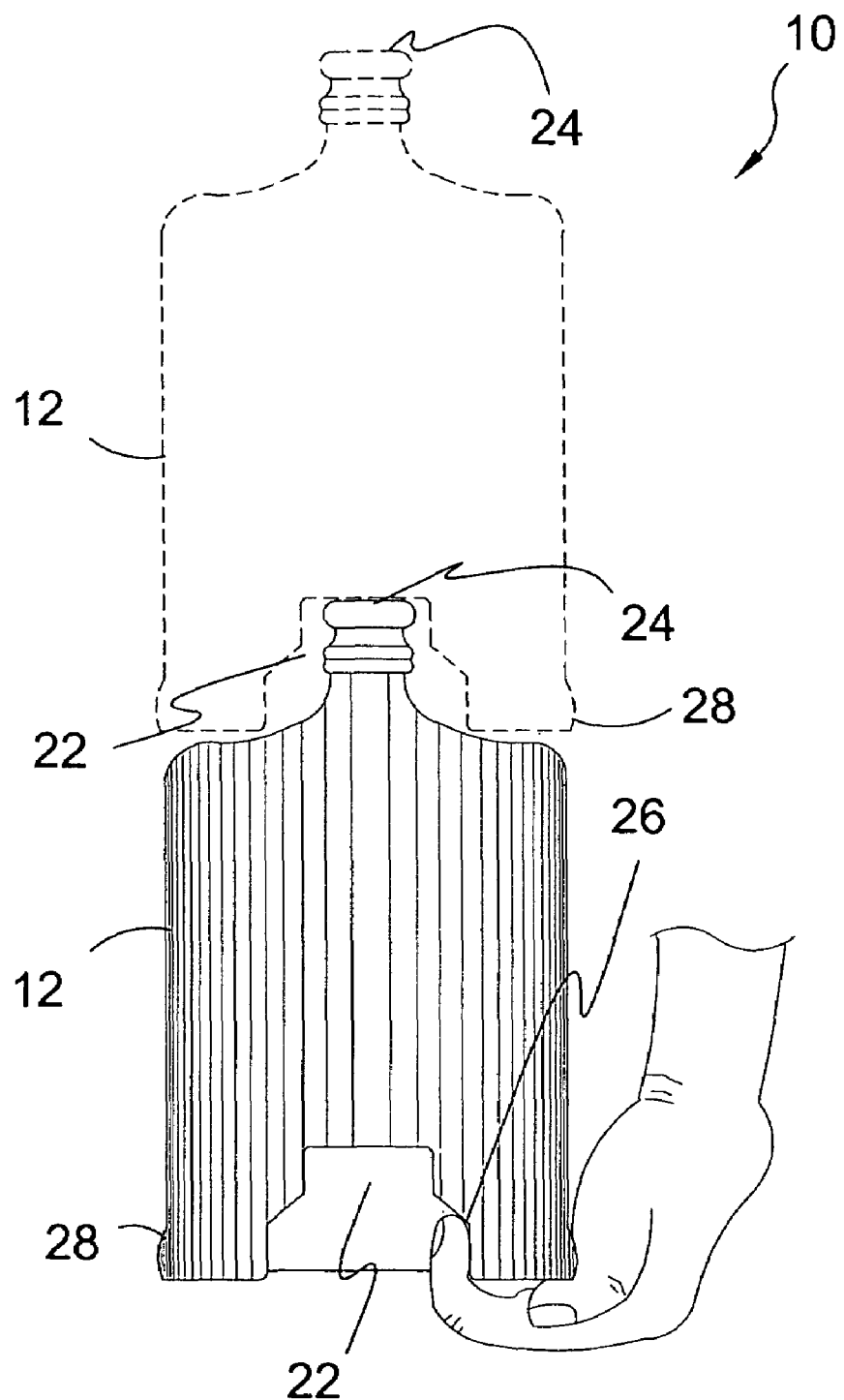
Figure 7:
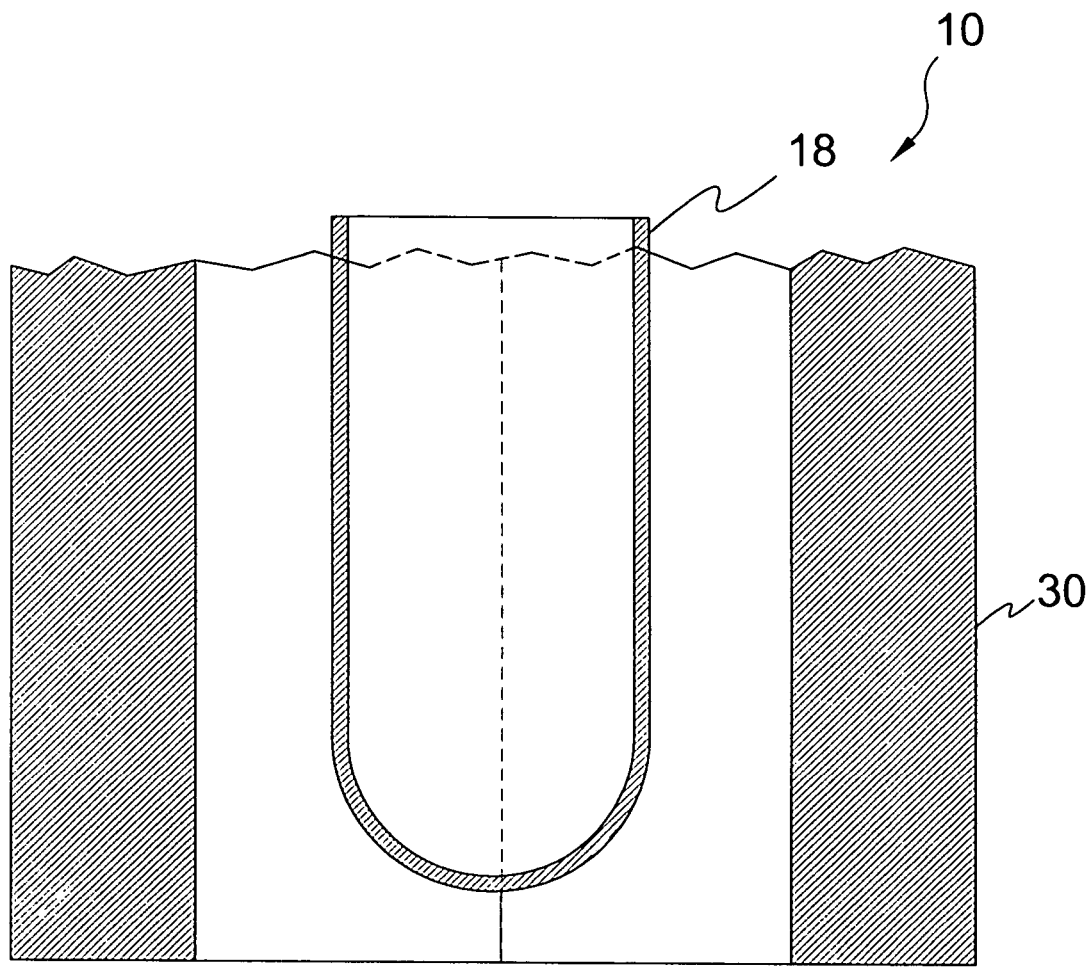
Figure 8:
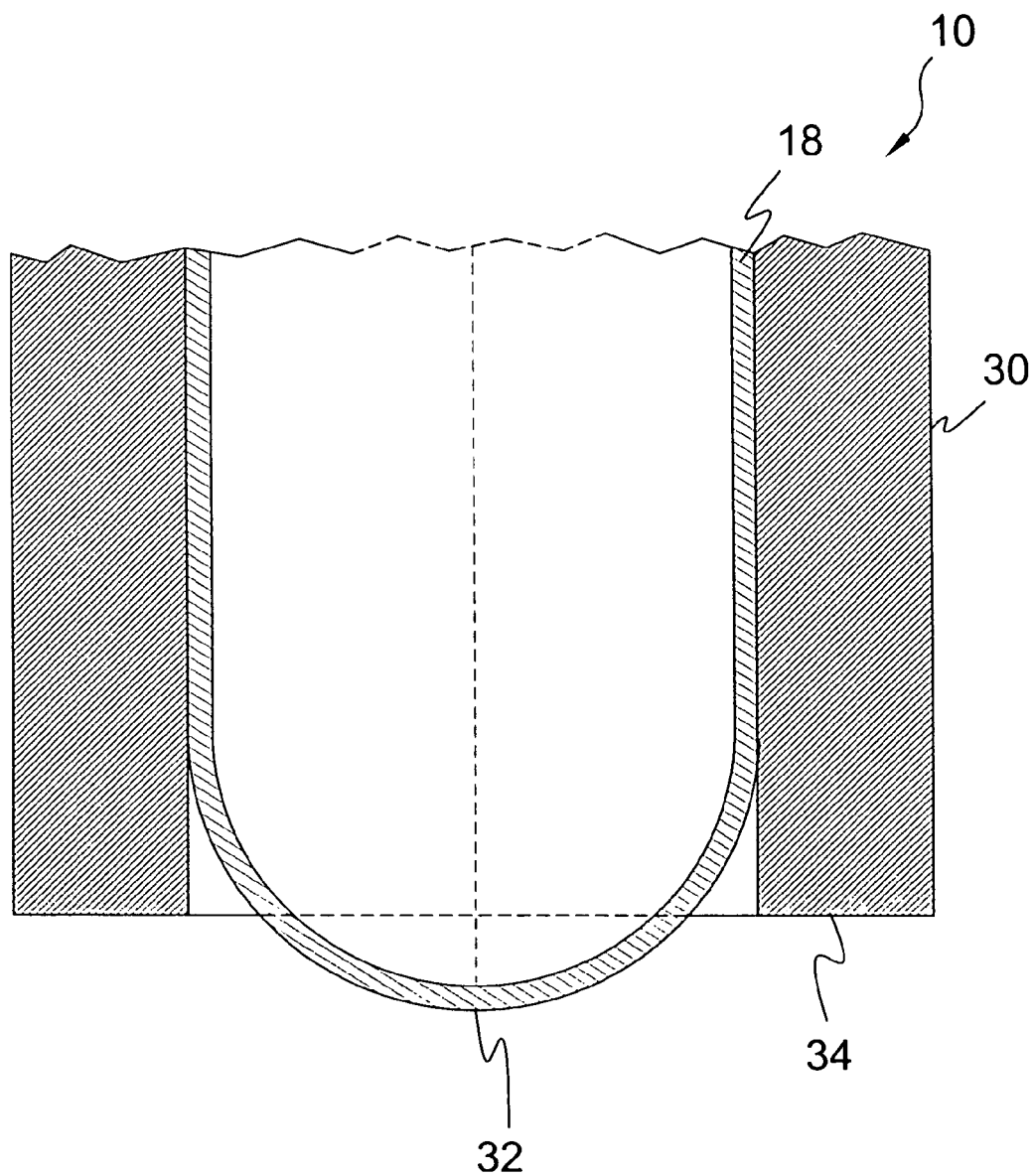
Figure 9:
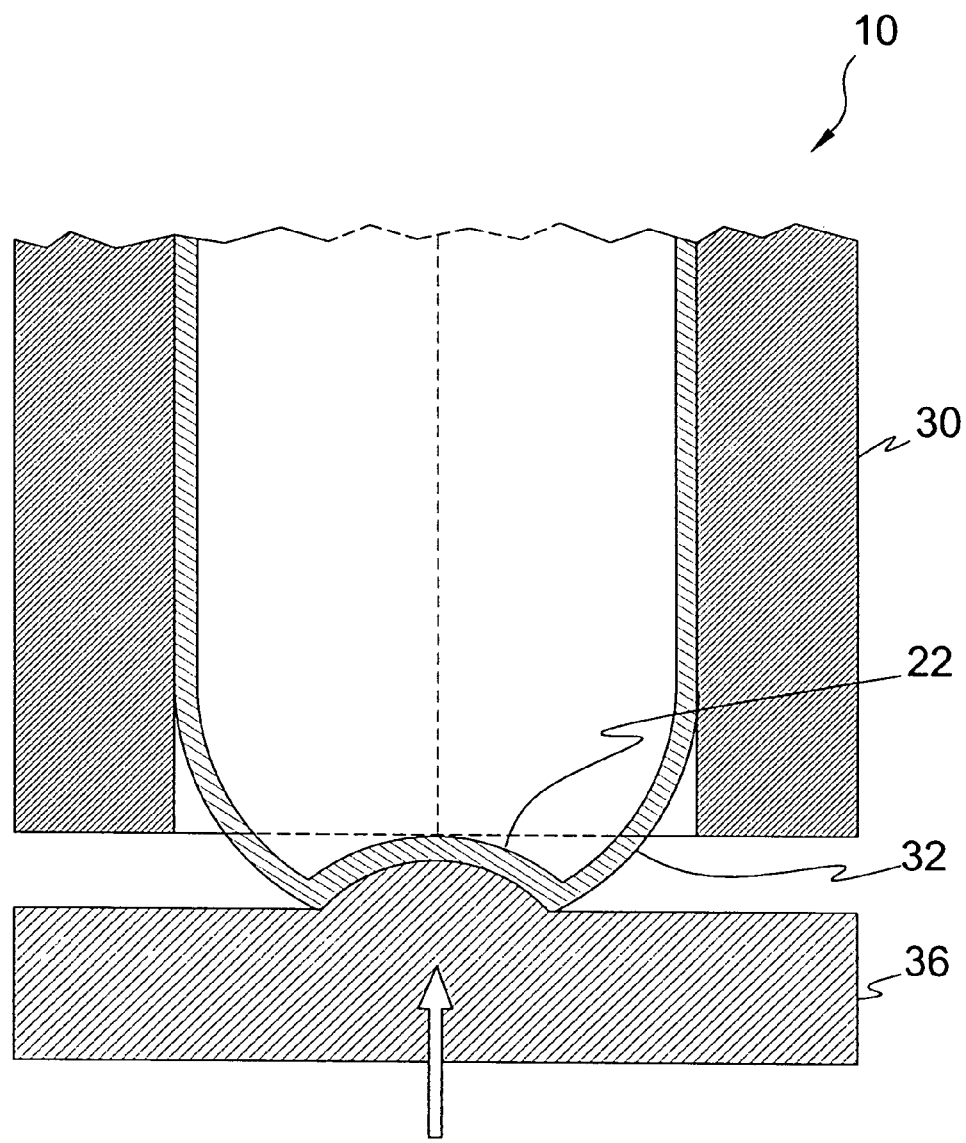
Figure 10:
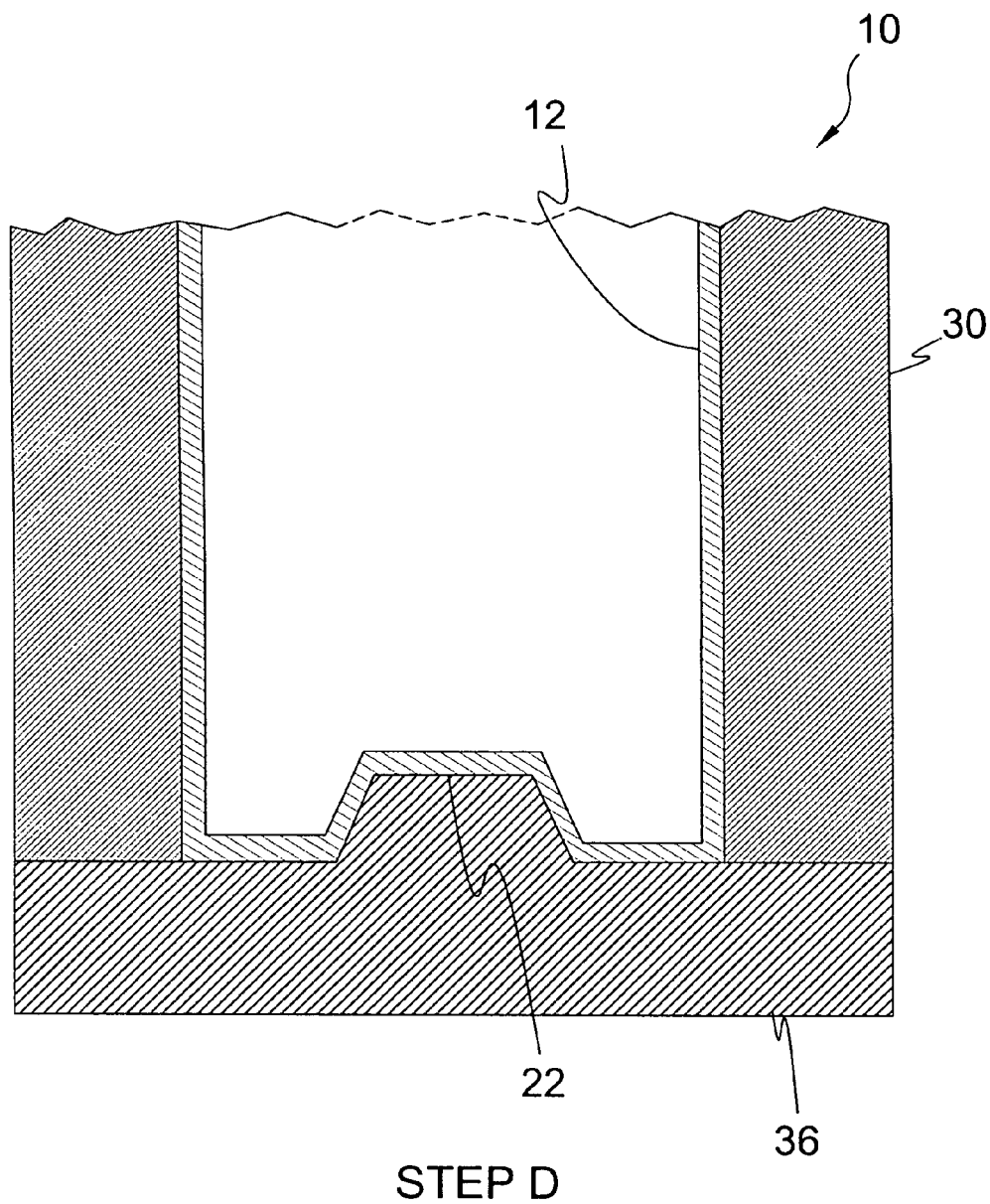
Figure 11:
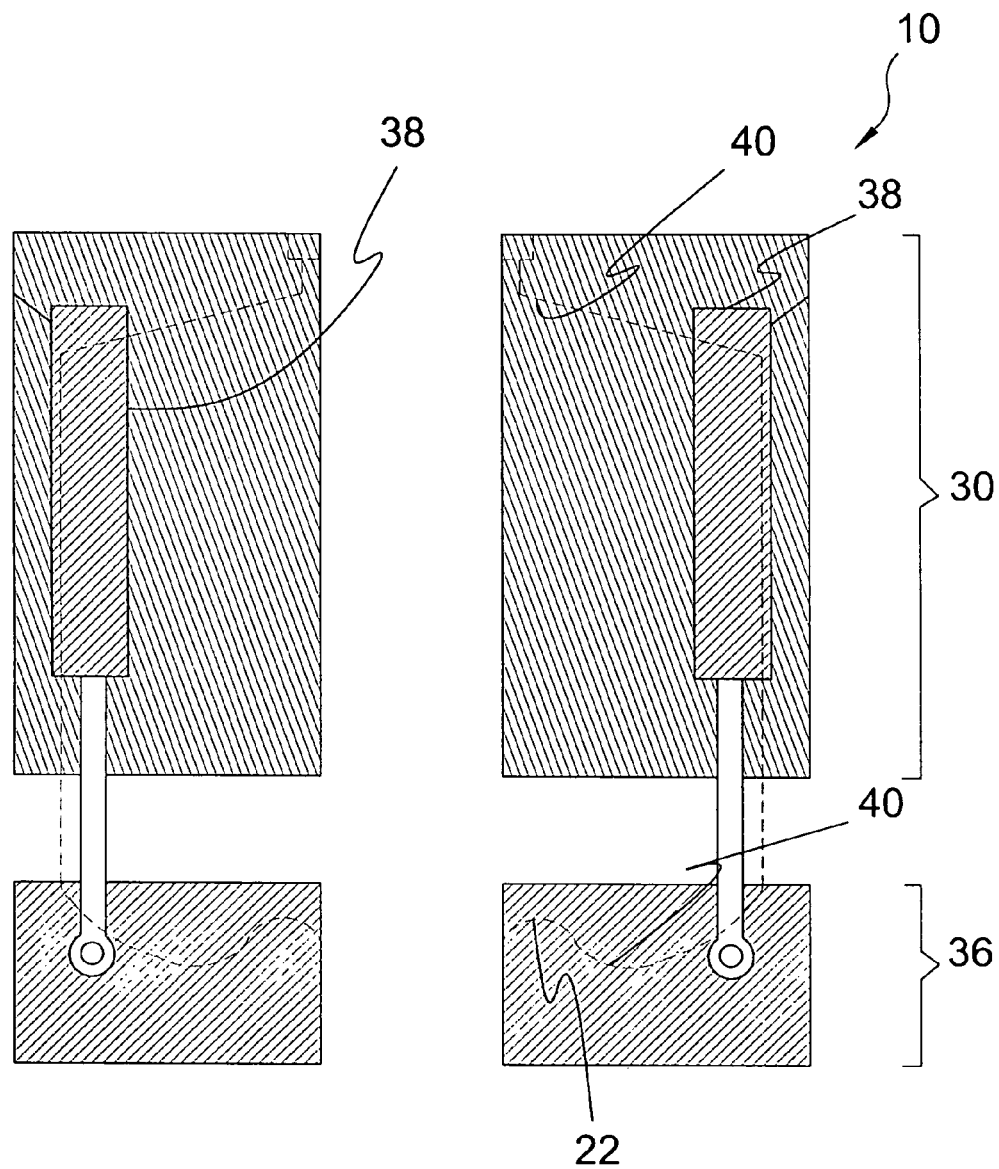
Figure 12:
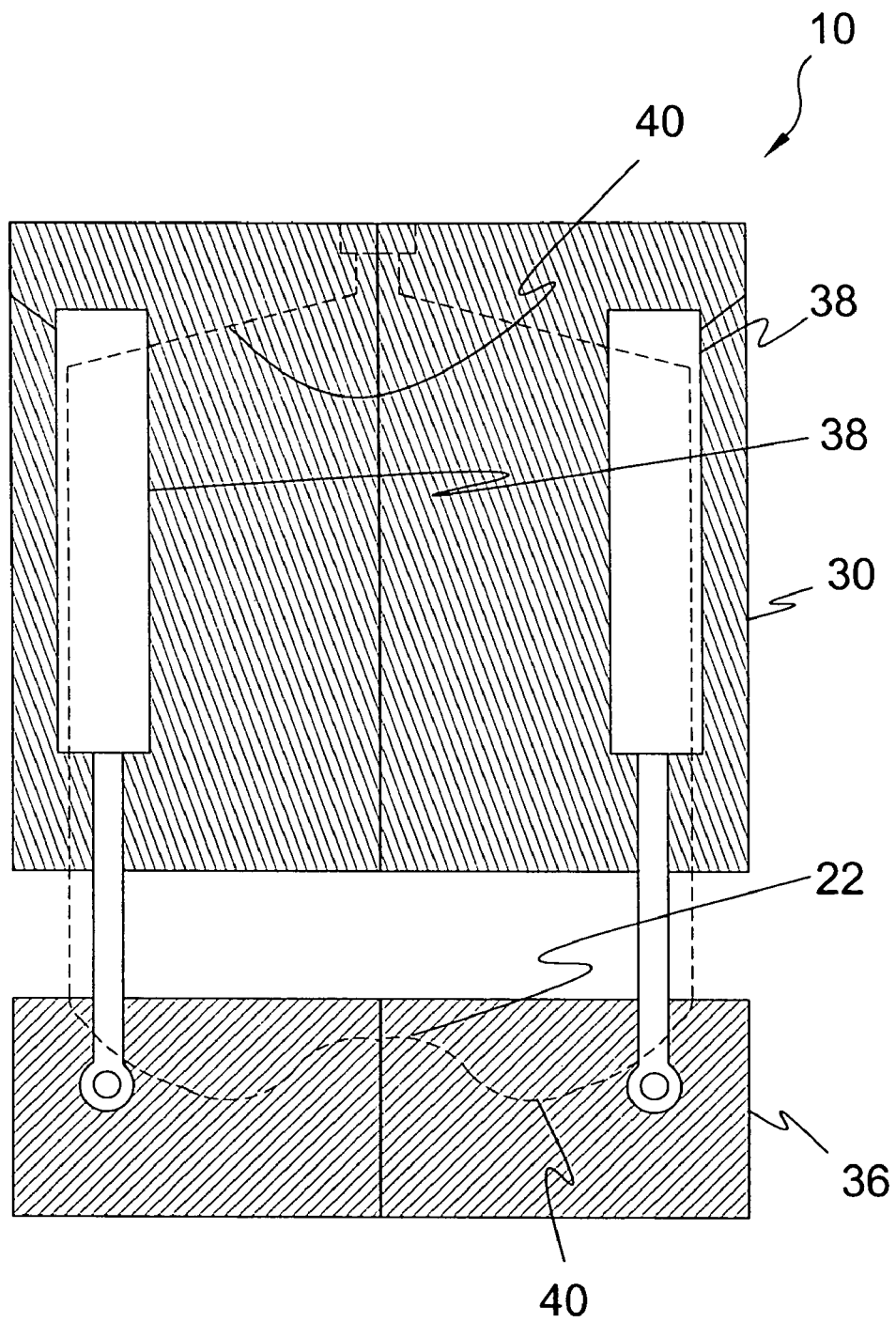
Figure 13:
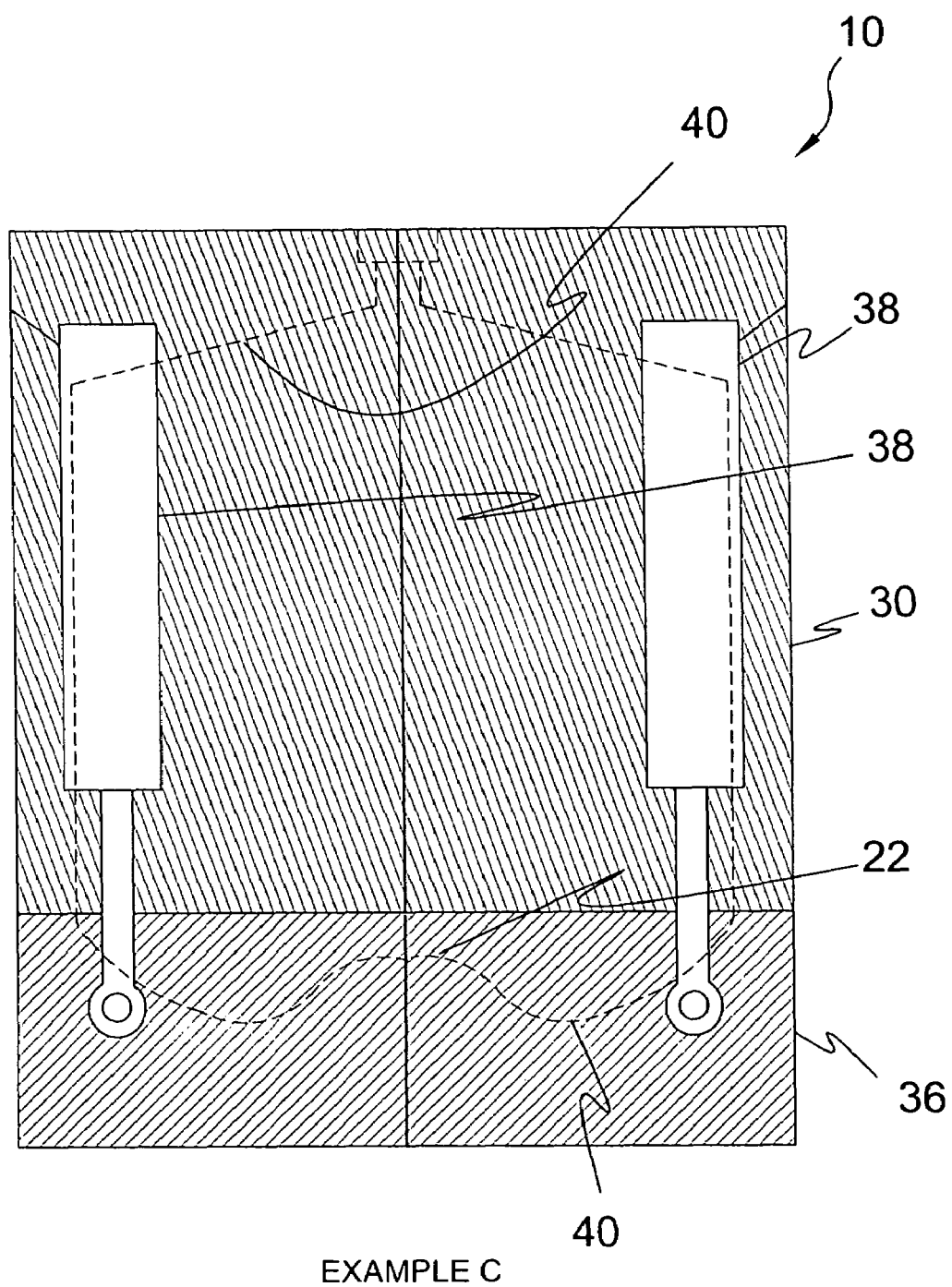
Figure 14:
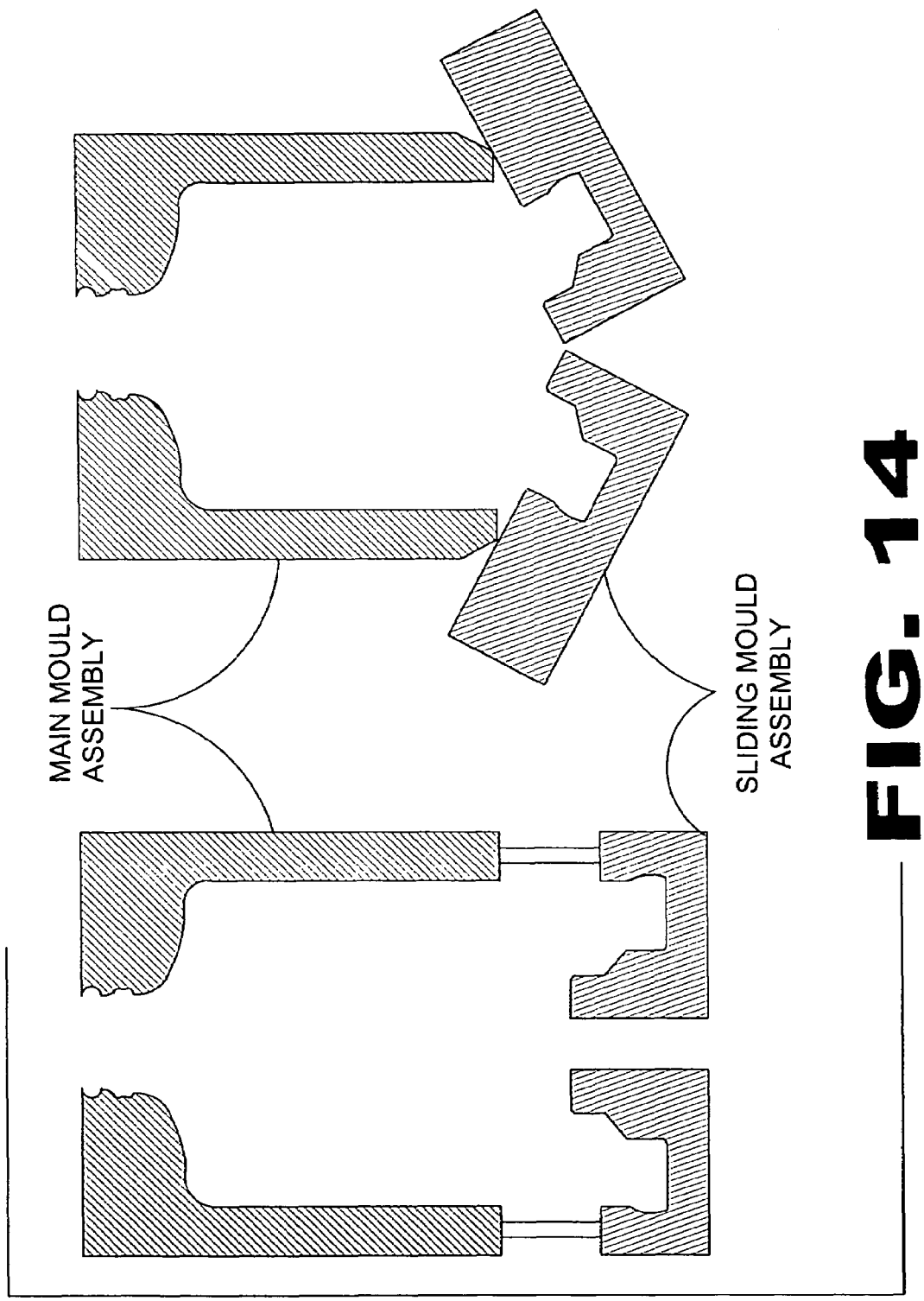
Figure 15:
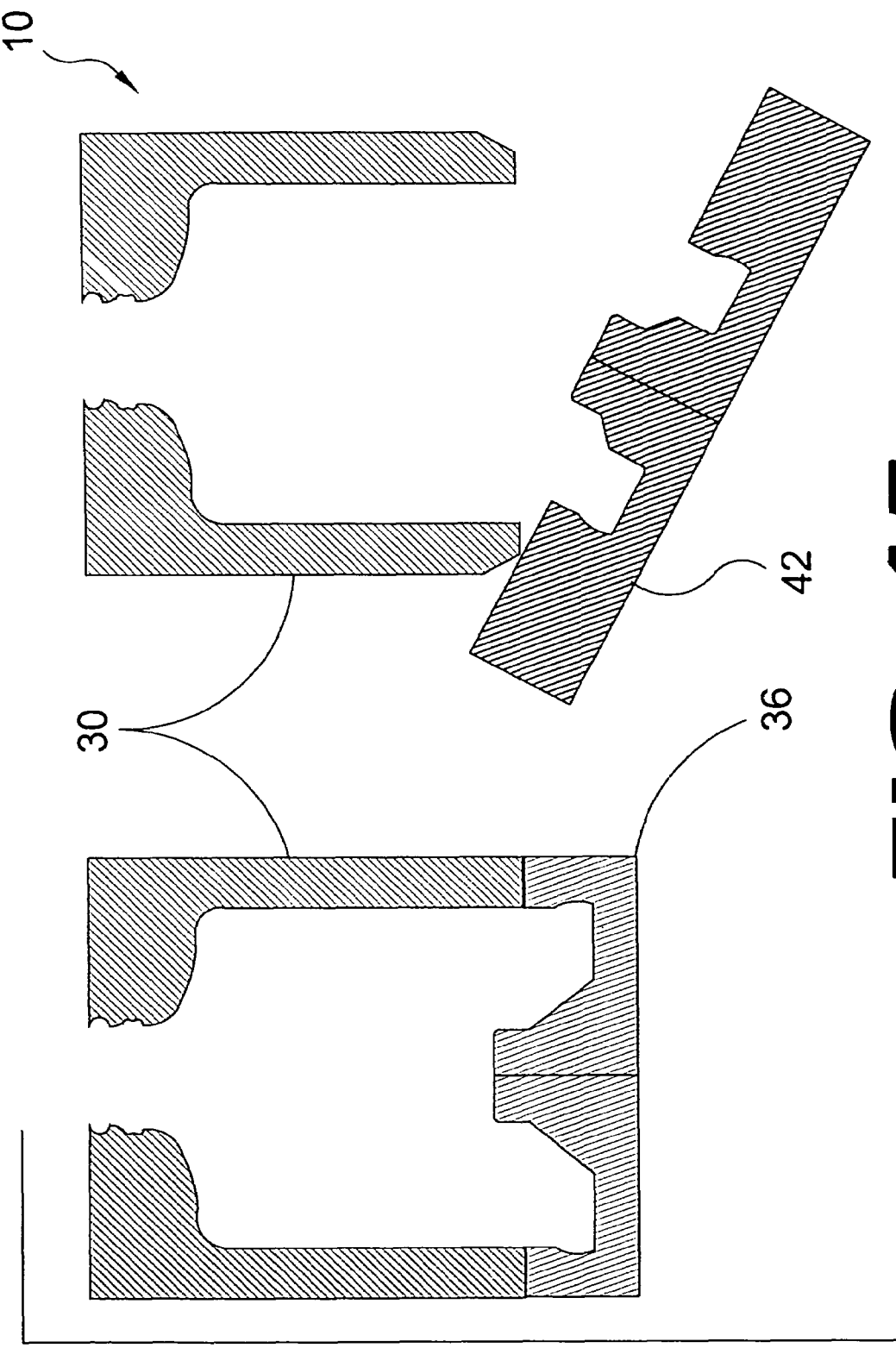

FIG. 5 is a detailed view of the present invention stacked;
FIG. 6 is an illustrative view of the present invention in use;
FIG. 7 is a sectional view of the present invention;
FIG. 8 is a sectional view of the present invention;
FIG. 9 is a sectional view of the present invention;
FIG. 10 is a sectional view of the present invention;
FIG. 11 is a diagram of the present invention;
FIG. 12 is a diagram of the present invention;
FIG. 13 is a diagram of the present invention;
FIG. 14 is an alternate illustration employing the method of the present invention; and
FIG. 15 is an another alternate illustration employing the method of the present invention.

DESCRIPTION OF THE REFERENCED NUMERALS

Turning now descriptively to the drawings, in which similar reference characters denote similar elements throughout the several views, the figures illustrate the Apparatus and Method of Manufacturing Stackable Containers of the present invention. With regard to the reference numerals used, the following numbering is used throughout the various drawing figures.

- 10 Apparatus and Method of Manufacturing Stackable Containers
- 12 stackable container
- 14 prior art
- 16 mould assembly of 14
- 18 parison
- 20 moulded bottle of 14
- 22 recessed bottom of 12
- 24 mouth of 12
- 26 hand grip of 12
- 28 base of 12
- 30 main mould assembly
- 32 parison head
- 34 mating surface of 30
- 36 sliding mould assembly
- 38 air pistons
- 40 cavity
- 42 secondary sliding mould assembly

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
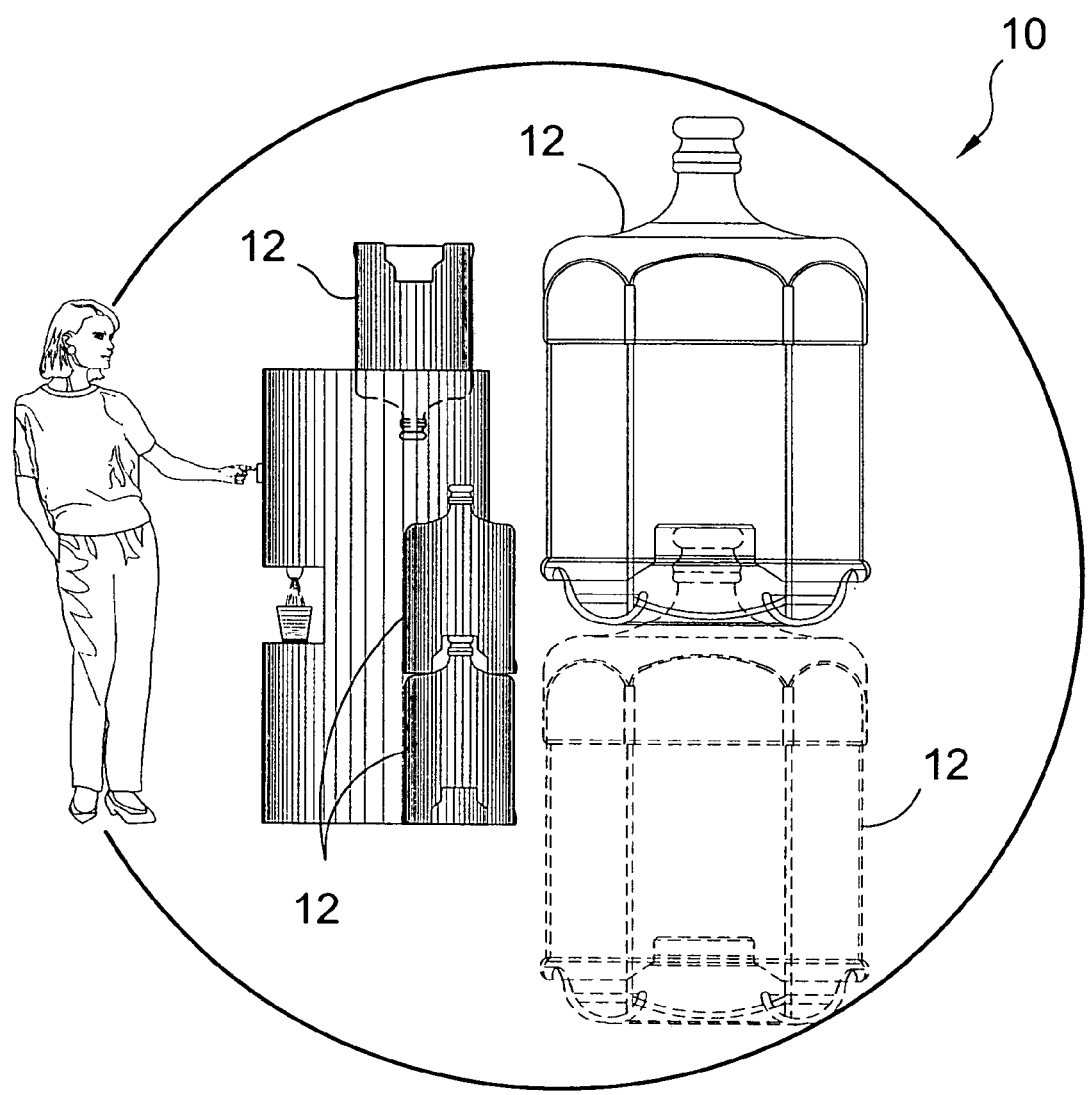
FIG. 1 is an illustrative view of the present invention in use.

FIG. 1 is an illustrative view of the present invention 10 in use. The present invention is a fluid receptacle and method of manufacturing said receptacle as a stackable container 12 having a substantially consistent wall thickness as a result of forming the body of the container and moving a base mould portion into engagement to form the base of the container 12.

Figure 2:
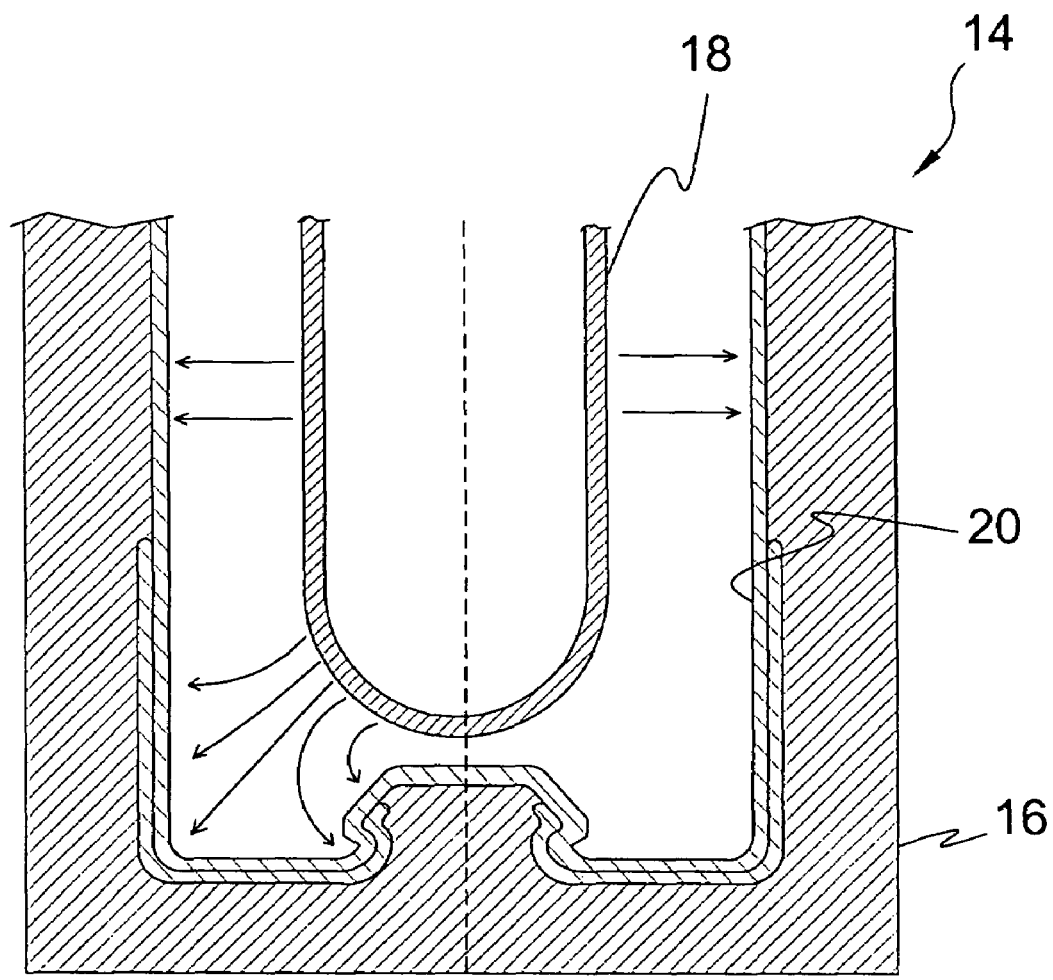
FIG. 2 is an illustration of conventional blow moulding technique.

FIG. 2 is an illustration of conventional blow moulding technique of the prior art 14. Shown is a cross-sectional schematic diagram depicting prior art 14 depicting the mould assembly 16 the parison 18 expanding diametrically to the sides with diffusion occurring at the base of the moulded bottle 20 resulting in a thinner wall base, which increases potential ruptures.

Figure 3:
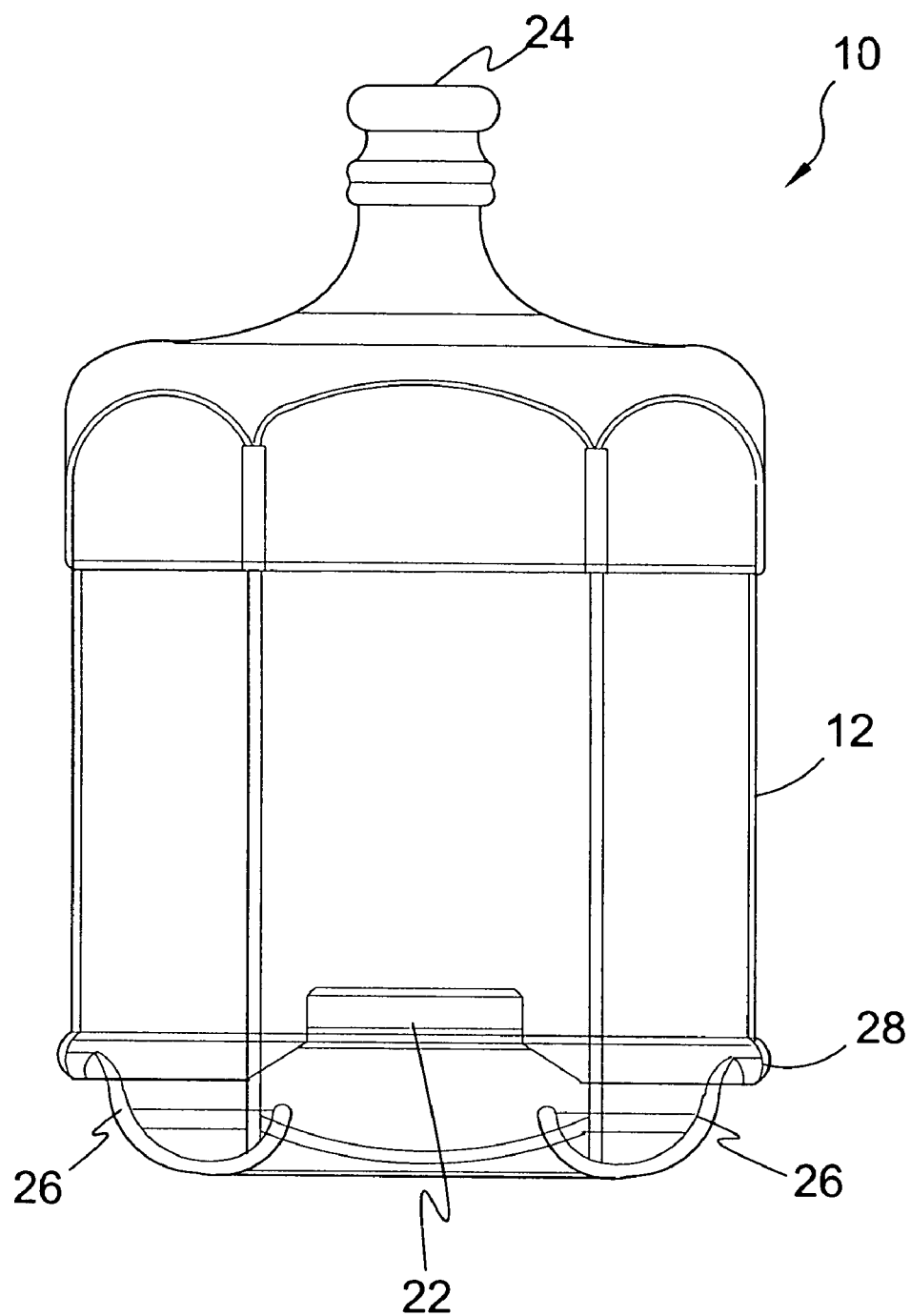
FIG. 3 is a side view of the present invention.

FIG. 3 is a side view of the present invention 10. The present invention 10 utilizes technology used to create plastic bottles for storing drinking water formed by blow moulding method. The improved blow moulding method and relevant apparatus is capable of making complicated designs with an equal wall thickness. This stackable bottle 12 features a recessed bottom 22 to accommodate the water supply mouth 24 for easy stacking. A hand grip 26 is also incorporated into the base 28 allowing a user to easily and safely pick up the bottle 12 with their fingers.

Figure 4:
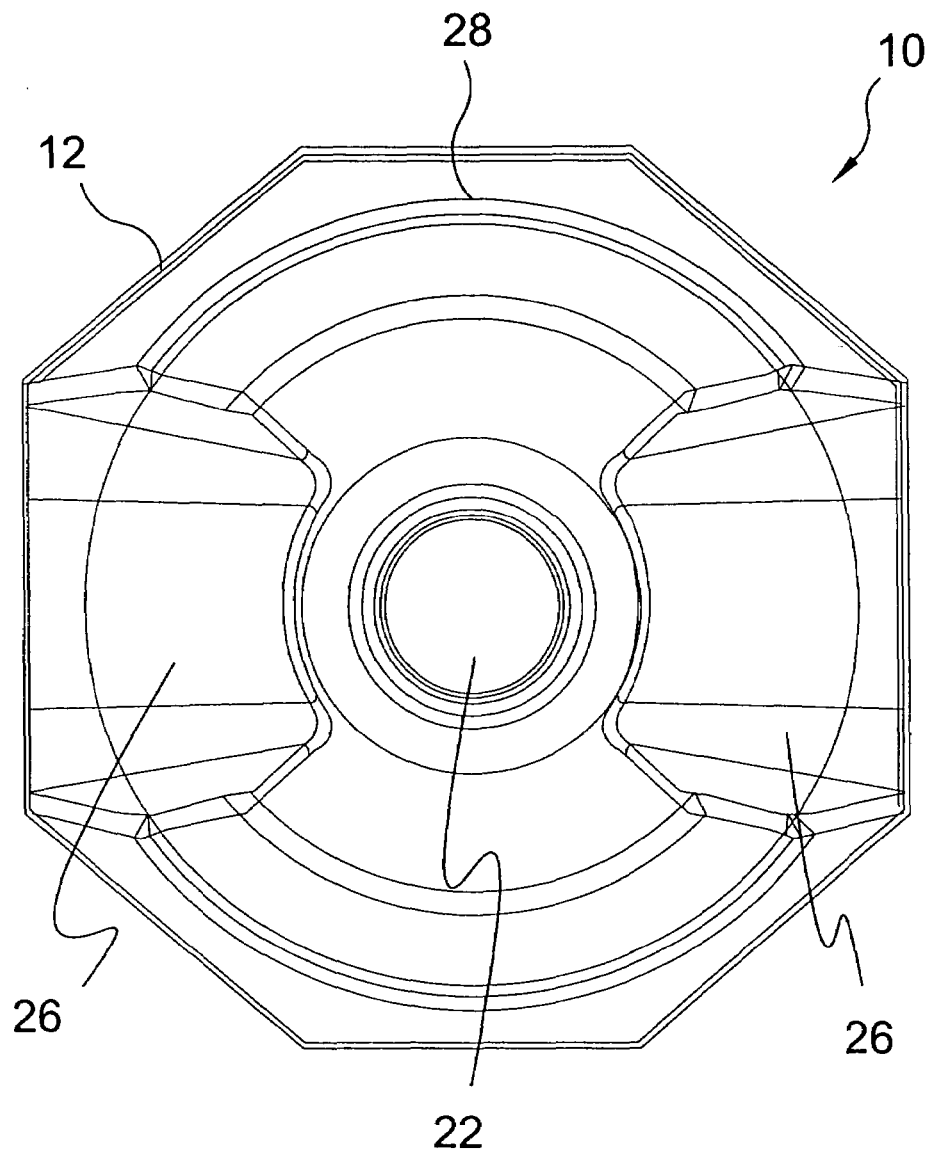
FIG. 4 is a bottom view of the present invention.

FIG. 4 is a bottom view of the present invention 10. Shown is a bottom view of the stackable container 12 which features a base 28 with a recessed bottom 22 to accommodate the water supply mouth 24 for easy stacking. Hand grips 26 are also incorporated into the base 28 allowing a user to easily and safely pick up the bottle 12 with their fingers.

FIG. 5 is a detailed view of the present invention 10 stacked. Shown is a detailed view of a pair of stackable containers 12 in a stacked position. This new moulded bottle 12 features a recessed bottom 22 to accommodate the water supply mouth 24 for easy stacking. Hand grips 26 are also incorporated into the base 28 allowing a user to easily and safely pick up the bottle with their fingers.

FIG. 6 is an illustrative view of the present invention 10 in use. The present invention 10 utilizes technology used to create plastic bottles 12 for storing drinking water formed by blow moulding method. The improved blow moulding method and relevant apparatus is capable of making complicated designs with an equal wall thickness. This new bottle 12 features a recessed bottom 22 to accommodate the water supply mouth 24 for easy stacking. Hand grips 26 are also incorporated into the base 28 allowing a user to easily and safely pick up the bottle 12 with their fingers.

FIG. 7 is a sectional view of the present invention 10. Illustrated is the method employed in the bottle manufacture that results in a product having a consistent wall thickness throughout providing a product of higher quality with substantially less probability of containment failure. The method is comprised of expanding the parison 18 (liquid plastic) in a main mould assembly 30 with the mould base portion spaced away for an initial resin expansion that produces the consistent wall thickness. A predetermined amount of parison 18 extends from the open base which is then moved into engagement with the mould walls creating the base recess as the parison 18 is fully expanded. Therefore, in addition to the improved ergonomic bottle, the present invention 10 provides a method of manufacture comprising a mould having a first member and a second member with means for moving the second member into engagement with the first member at a predetermined time during a blow moulding task and the method of expanding the parison 18 within the first member having the second member in an initial wait-state until a predetermined amount of parison 18 expansion has occurred whereupon the second member is moved into engagement with the first member forming the container shape which is finalized during further parison 18 expansion.

FIG. 8 is a sectional view of the present invention 10. The exposed head 32 of the expanded parison 18 is pushed past the mating surface 34 of the main mould assembly 30.

FIG. 9 is a sectional view of the present invention 10. The shape of the expanded parison head 32 is changed through compression by pressing of the sliding mould assembly 36 towards the main mould assembly 30, thereby forming the recessed bottom 22 of the bottle.

FIG. 10 is a sectional view of the present invention 10. The unique blow moulding method is completed when the main mould assembly 30 and sliding mould assembly 36 form a seal and the parison 18 is fully expanded inside to form a bottle 12 of the desired shape with a bottom depression 22.

FIG. 11 is a diagram of the present invention 10. Shown is a diagram and front view operating diagram of one version of the apparatus, showing the apparatus open. Shown is the main mould assembly 30 using air cylinder pistons 38 to attract and withdraw the sliding mould assembly 36. Also shown are the cavities 40 and the recessed bottom 22 formed therein.

FIG. 12 is a diagram of the present invention 10. Shown is a diagram and front view operating diagram of one version of the apparatus, showing the apparatus half closed. Shown is the main mould assembly 30 using air cylinder pistons 38 to attract and withdraw the sliding mould assembly 36. Also shown are the cavities 40 and the recessed bottom 22 formed therein.

FIG. 13 is a diagram of the present invention 10. Shown is a diagram and front view operating diagram of one version of the apparatus, showing the apparatus fully closed. Shown is the main mould assembly 30 using air cylinder pistons 38 to attract and withdraw the sliding mould assembly 36. Also shown are the cavities 40 and the recessed bottom 22 formed therein.

FIG. 14 is an alternate illustration employing the method of the present invention 10. Shown is a main mould assembly 30 with a cavity in the shape of a tubular bottle and sliding mould assembly 36 with a cavity corresponding to the bottom wall of the bottle. The present invention 10 provides that a first mould member comprised of one or more mould sections creates an initial cavity for the parison expansion with a second mould member, preferably forming the base to prevent diffusion of the parison, moving into closure of the mould cavity at a predetermined point in the mould forming task. Also shown is a secondary sliding mould assembly 42 that is pivotally hinged to the main mould assembly 30.

FIG. 15 is an another alternate illustration employing the method of the present invention. Shown is a main mould assembly with a cavity in the shape of a tubular bottle and secondary mould assembly with a cavity corresponding to the bottom wall of the bottle. The present invention provides that a first mould member comprised of one or more mould sections creates an initial cavity for the parison expansion with a second mould member, preferably forming the base to prevent diffusion of the parison, moving into closure of the mould cavity at a predetermined point in the mould forming task.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A method for manufacturing stackable containers that insures consistent wall thickness, the method comprising:
    a) providing a main mould assembly cylindrical in shape having an open base for receiving a parison;
    b) providing a secondary slidable mould assembly, said slidable mould assembly capable of moving along a central axis of said main mould assembly toward said main mould assembly to engage said main mould assembly;
    c) providing a pair of air pistons parallel to and spaced from said central axis for moving said slidable mould assembly to and from said main mould assembly, arms extending from said air pistons being in line with said air pistons and directly connected to said slidable mould assembly;
    d) expanding said parison until it engages the walls of said main mould assembly and a head of said parison has expanded beyond said open base a predetermined distance; and
    e) maintaining said secondary slidable mould assembly in an initial wait-state until said parison has reached its desired expansion and said parison head has expanded to the predetermined distance whereupon said slidable mould assembly moves along the central axis of said main mould assembly toward said main mould assembly to engage said main mould assembly and conforming said parison to the shape of said slidable mould assembly while said parison maintains a uniform wall thickness even when moulding complex shapes and angles.

2. The method of claim 1, wherein said stackable containers have a neck member disposed on the top portion forming a mouth to introduce the contents therein and distribute the content therefore.

3. The method of claim 2, wherein said stackable containers further include a centrally located recessed bottom having a depression conforming substantially to said mouth therefore facilitating the stacking thereof.

4. The method of claim 3, wherein said recessed bottom of said stackable containers further includes at least one hand hold formed therewith to facilitate handling by the user.

5. The method of claim 2, wherein said stackable containers further includes a polygonal exterior surface to optimize shipping and storage of a plurality thereof.

* * * * *